(12) United States Patent
Wetzel

(10) Patent No.: US 7,344,360 B2
(45) Date of Patent: Mar. 18, 2008

(54) WIND TURBINE ROTOR BLADE WITH IN-PLANE SWEEP AND DEVICES USING SAME, AND METHODS FOR MAKING SAME

(75) Inventor: Kyle Kristopher Wetzel, Lawrence, KS (US)

(73) Assignee: General Electric Company, Schenectady, NY (US)

( * ) Notice: Subject to any disclaimer, the term of this patent is extended or adjusted under 35 U.S.C. 154(b) by 231 days.

(21) Appl. No.: 10/953,040

(22) Filed: Sep. 29, 2004

(65) Prior Publication Data

US 2006/0067828 A1   Mar. 30, 2006

(51) Int. Cl.
    *F01D 5/14* (2006.01)
(52) U.S. Cl. ..................... 416/238; 416/242
(58) Field of Classification Search ............ 416/223 R, 416/223 A, 228, 235, 237, 238, 242, DIG. 2; 29/889.7, 889.71
See application file for complete search history.

(56) References Cited

U.S. PATENT DOCUMENTS

| | | | | |
|---|---|---|---|---|
| 1,991,095 A | * | 2/1935 | Hochstetter | ................. 416/238 |
| 2,451,106 A | * | 10/1948 | Martin | ........................ 416/238 |
| 4,012,172 A | * | 3/1977 | Schwaar et al. | ............ 416/228 |
| 4,451,206 A | | 5/1984 | Philippe et al. | |
| 4,863,351 A | | 9/1989 | Fischer et al. | |
| 5,064,345 A | | 11/1991 | Kimball | |
| 5,137,427 A | | 8/1992 | Shenoy | |
| 5,167,489 A | | 12/1992 | Wadia et al. | |
| 5,254,876 A | * | 10/1993 | Hickey | ........................ 416/238 |
| 5,332,362 A | * | 7/1994 | Toulmay et al. | ........ 416/223 R |
| 5,584,661 A | | 12/1996 | Brooks | |
| 6,000,911 A | * | 12/1999 | Toulmay et al. | ........ 416/223 R |
| 6,116,857 A | * | 9/2000 | Splettstoesser et al. | ..... 416/228 |
| 6,503,058 B1 | | 1/2003 | Selig et al. | |
| 6,558,123 B1 | * | 5/2003 | Spaggiari | ..................... 416/238 |
| 6,582,196 B1 | | 6/2003 | Andersen et al. | |
| 6,595,744 B2 | * | 7/2003 | Van Houten | ................. 416/238 |
| 6,719,533 B2 | * | 4/2004 | Bird | ........................... 416/238 |

FOREIGN PATENT DOCUMENTS

WO    WO-01/48377 A1 *   6/2001

OTHER PUBLICATIONS

Mike Zutek, Adaptive Blade Concept Assessment: Curved Planform Induced Twist Investigation, SAND2002-2996, Oct. 2002, pp. 1-24.
Thomas D. Ashwill, Paul S. Veers, James Locke, Ivan Contreras, Dayton Griffin, Mike D. Zutek, Concepts for Adaptive Wind Turbine Blades, AIAA-2002, pp. 1-14.

* cited by examiner

*Primary Examiner*—Richard A. Edgar
(74) *Attorney, Agent, or Firm*—James E. McGinness, Esq.; Armstrong Teasdale LLP

(57) ABSTRACT

A wind turbine includes a rotor having a hub and at least one blade having a torsionally rigid root, an inboard section, and an outboard section. The inboard section has a forward sweep relative to an elastic axis of the blade and the outboard section has an aft sweep.

22 Claims, 5 Drawing Sheets

(REPRESENTATIVE OF)
PRIOR ART

WIND TURBINE ROTOR BLADE WITH IN-PLANE SWEEP AND DEVICES USING SAME, AND METHODS FOR MAKING SAME

STATEMENT REGARDING FEDERALLY SPONSORED RESEARCH & DEVELOPMENT

The U.S. Government has certain rights in this invention as provided for by the terms of Contract No. ZAM-7-13320-26 awarded by the Department of Energy, National Renewable Energy Laboratory Division, under Prime Contract No. DE-AC36-83CH10093 with the U.S. Department of Energy.

BACKGROUND OF THE INVENTION

This invention relates to blades that are particularly useful as wind turbine rotor blades and to rotors and wind turbines utilizing such blades.

At least one known rotor blade configuration includes an aft-swept rotor blade design. When a wind gust strikes a blade with aft sweep, an increase in out-of-plane (flapwise) loading produces a pitching moment about sections further inboard. This pitching moment acts to induce outer portions of the blade to twist the leading edge of the blade sections into the wind so as to reduce an aerodynamic angle of attack of those sections, thereby ameliorating peak transient loads that the blade would otherwise experience. However, if the root of the blade remains unswept or is swept aft, the pitching moment induced over the entire blade is reacted at the root of the blade through pitch drive hardware. For even modest sweep, this moment can overwhelm baseline aerodynamic pitching moments for which the pitch hardware is designed. In other words, although in-plane aft sweep of wind turbine rotor blades can be used to ameliorate transient loads, aft sweep also induces pitching moments at the blade root that can overwhelm the baseline aerodynamic pitching moments for which the pitch hardware is designed.

For example, many known straight swept blades with zero root sweep exhibit very high changes in root torsion due to coupling. The same is true of some curved blades designed without a constraint on root torsion. At least one known baseline configuration exhibits a maximum nose-down pitching moment about the blade root of approximately 30-40 kNm. In some swept blades, the nose-down moment increases to hundreds of kNm. Pitch drives on at least one known wind turbine model, the GE 1.5 turbine available from General Electric Co., Fairfield, Conn. are designed, with safety factors included, for 100 kNm applied load. Therefore, increases in nose-down moment of more than 20-30 kNm should be avoided.

BRIEF DESCRIPTION OF THE INVENTION

Some aspects of the present invention therefore provide a blade having a torsionally rigid root, a forward sweep relative to an elastic axis in an inboard section of the blade and an aft sweep in an outboard section of the blade.

In other aspects, the present invention provides a rotor for a wind turbine. The rotor has a hub and at least one blade having a torsionally rigid root, an inboard section, and an outboard section. The inboard section has a forward sweep relative to an elastic axis of the blade and the outboard section has an aft sweep.

In still other aspects, the present invention provides a wind turbine that includes a rotor having a hub and at least one blade having a torsionally rigid root, an inboard section, and an outboard section. The inboard section has a forward sweep relative to an elastic axis of the blade and the outboard section has an aft sweep.

In yet other aspects, the present invention provides a method for making a blade for a wind turbine. The method includes determining a blade shape by selecting sweep angles for elements of said blade so as to (a) increase or maximize an amount of twist induced and the distribution of the twist in such a manner as to create a reduction loads, (b) reduce or minimize an increase in blade material necessary to maintain tip deflection, (c) reduce or minimize negative effects on aerodynamics, and (d) maintain structural integrity, and fabricating a blade in accordance with the determined blade shape.

It will be appreciated that, when rotor blades are swept forward by the proper amount, configurations of the present invention reduce or eliminate a pitching moment at blade roots resulting from sweep. Also, a forward sweep of inboard sections of the rotor blades will not produce a harmful twist of measurable magnitude in those sections because the blade root is torsionally extremely rigid. Because the sweep of outboard sections of the blade remains unchanged relative to sections further inboard in configurations of the present invention, the twist induced by the outboard sweep also remains unchanged.

It will also observed that configurations of the invention present invention produce beneficial coupling between a flapwise (that is, out-of-plane) deflection of a rotor blade and twisting (that is, pitching) of the rotor blade with little or no increase in root pitch torque. Coupled twisting of the rotor blade also produces a general reduction in transient loads experienced by the wind turbine. Forward sweep inboard also enables greater sweep-induced coupling magnitude for a blade geometry that will fit within a given geometric envelope.

BRIEF DESCRIPTION OF THE DRAWINGS

In FIGS. 2, 3, and 4, the plane of the paper is the plane of the rotor. The line at the left end of the graph can be interpreted as a blade hub or blade root bearing. The X-axis corresponds to the pitch axis P, whereas a line through the blade and denoted by E represents the elastic or structural axis of the blade. The angle $\theta$, which may vary spanwise along the blade, denotes the angle formed between the elastic axis E and the pitch axis P. The trailing edge of each blade is at the top of the figure, and the leading edge is at the bottom. The blades are thus facing downward.

DETAILED DESCRIPTION OF THE INVENTION

As used herein, the term "sweep" refers to an angle of an elastic axis relative to a pitch axis of a blade, where the "elastic axis" refers to a locus of points defining a torsional center at each spanwise section of the blade.

Figure 1:
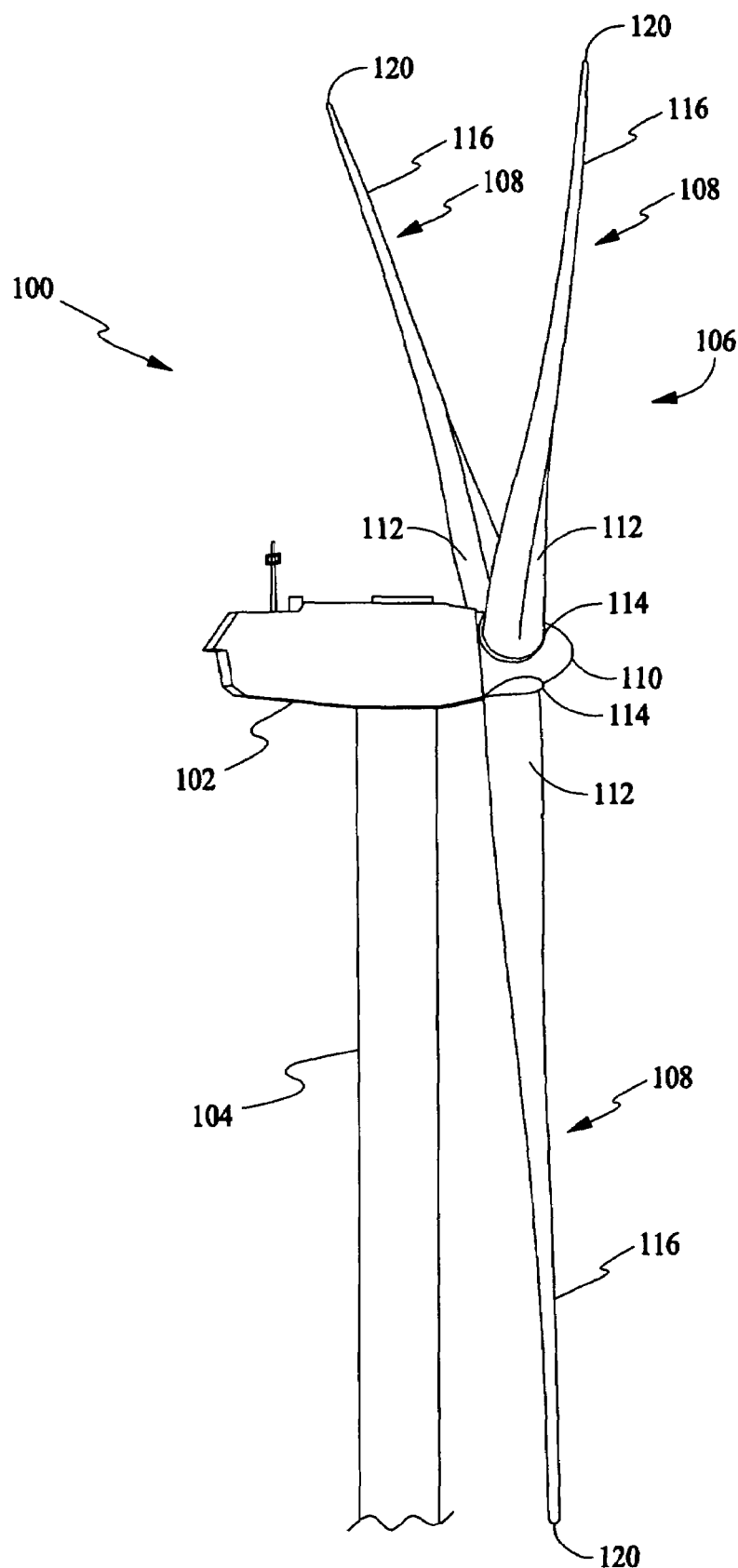
FIG. 1 is a drawing of an exemplary configuration of a wind turbine of the present invention.

In some configurations and referring to FIG. 1, a wind turbine 100 in some configurations comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Various components of wind turbine 100 in the illustrated configuration are housed in nacelle 102 atop tower 104 of wind turbine 100. The height of tower 104 is selected based upon factors and conditions known in the art. In some configurations, one or more microcontrollers comprising a control system are used for overall system monitoring and control including pitch and speed regulation, high-speed shaft and yaw brake application, yaw and pump motor application and fault monitoring. Alternative distributed or centralized control architectures are used in some configurations. The pitches of blades 108 can be controlled individually in some configurations. Hub 110 and blades 108 together comprise wind turbine rotor 106. Rotation of rotor 106 causes a generator (not shown in the figures) to produce electrical power.

In some configurations of the present invention, rotor blades 108 of a wind turbine 100 are swept forward relative to an elastic axis E (in a plane of rotation of the rotor) in an inboard region 112. When swept forward by a proper amount, a pitching moment of blade 108 at their roots 114 due to sweep is reduced or eliminated. Forward sweep of inboard sections 112 of rotor blades 108 do not produce adverse twist of measurable magnitude of sections 112 because blade roots 114 are torsionally extremely rigid. Because the sweep of outboard sections 116 of blades 108 remains unchanged relative to sections further inboard, twist induced by the outboard sweep also remains unchanged.

Figure 2:
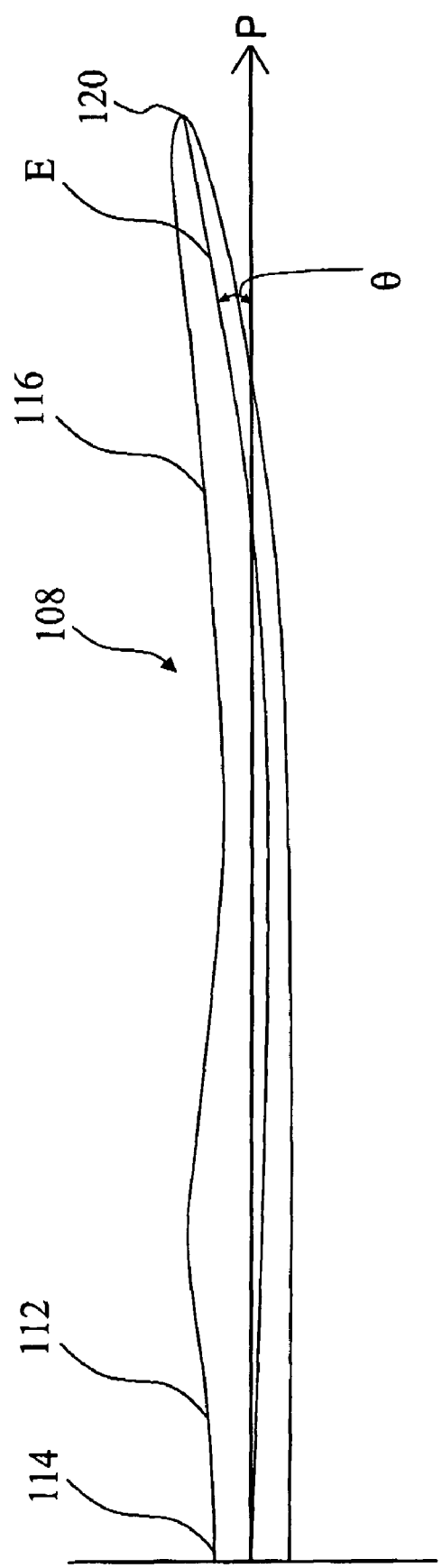
FIG. 2 is graphical representation of a moderately swept blade configuration of the present invention suitable for use in the wind turbine configuration represented in FIG. 1.
Figure 3:
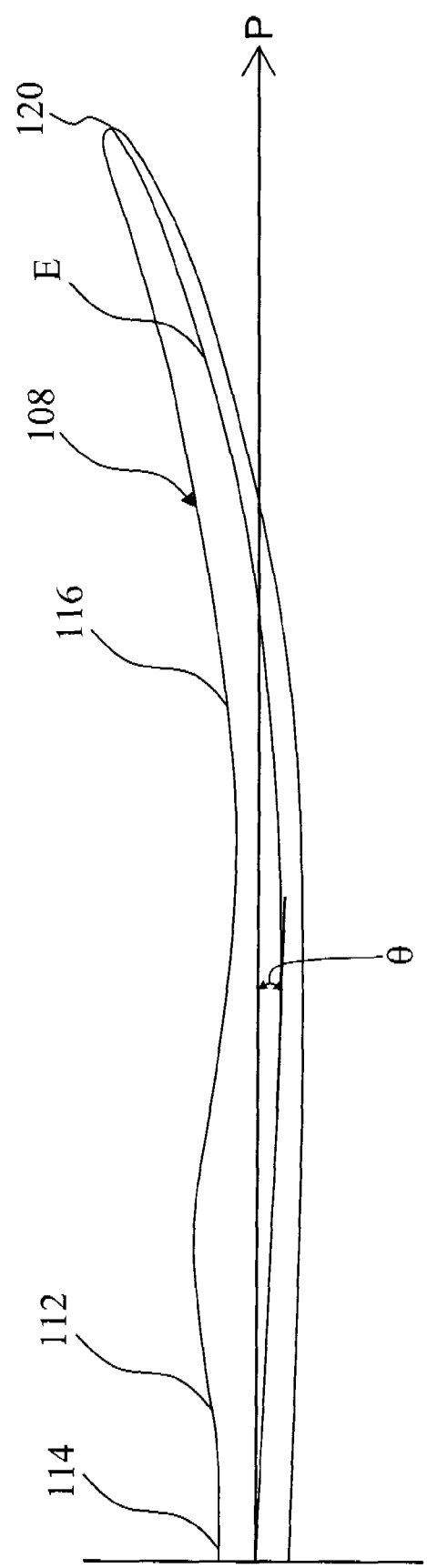
FIG. 3 is a graphical representation of a highly swept blade configuration of the present invention suitable for use in the wind turbine configuration represented in FIG. 1.

In some configurations and referring to FIG. 2, blades 108 include a moderate sweep inboard on the order of 1 to 2 degrees relative to blade pitch axis P, while outboard sections 116 are swept aft up to 10 degrees relative to pitch axis P. Configurations of the present invention are applicable to blades 108 of any length. For example, and not by way of limitation, in some configurations, blades 108 are 0.5 meters long, while in other configurations, blades 108 are 50 meters long. Other non-limiting examples of blade 108 lengths include 10 meters or less, 20 meters, 37 meters, and 50 meters. Although the optimum forward inboard sweep can vary for different blade lengths, a forward inboard sweep of at least as little as 0.25 degrees is used in some configurations of the present invention. This amount of inboard sweep is greater than the manufacturing tolerance for a blade with zero sweep mounted on a hub and provides some benefit of root torsion control as an unexpected benefit. In some configurations of the present invention, a greater benefit is achieved with a blade 108 having at least 0.5 degrees of inboard forward sweep. In some configurations, at least 1.0 degrees of inboard forward sweep is used, or even more, e.g., 2.0 to 3.0 degrees. As such, the forward sweep may be between 1 and 3 degrees, inclusive. In some configurations and referring to FIG. 3, more significant twist-flap coupling is achieved with outboard sections swept as much as 20 degrees relative to pitch axis P, with an inboard sweep of up to 10 to 15 degrees forward to relieve the incremental pitch torque. In many configurations, the amount of aft sweep outboard is less than the amount of forward sweep at the root of the blade.

Figure 4:
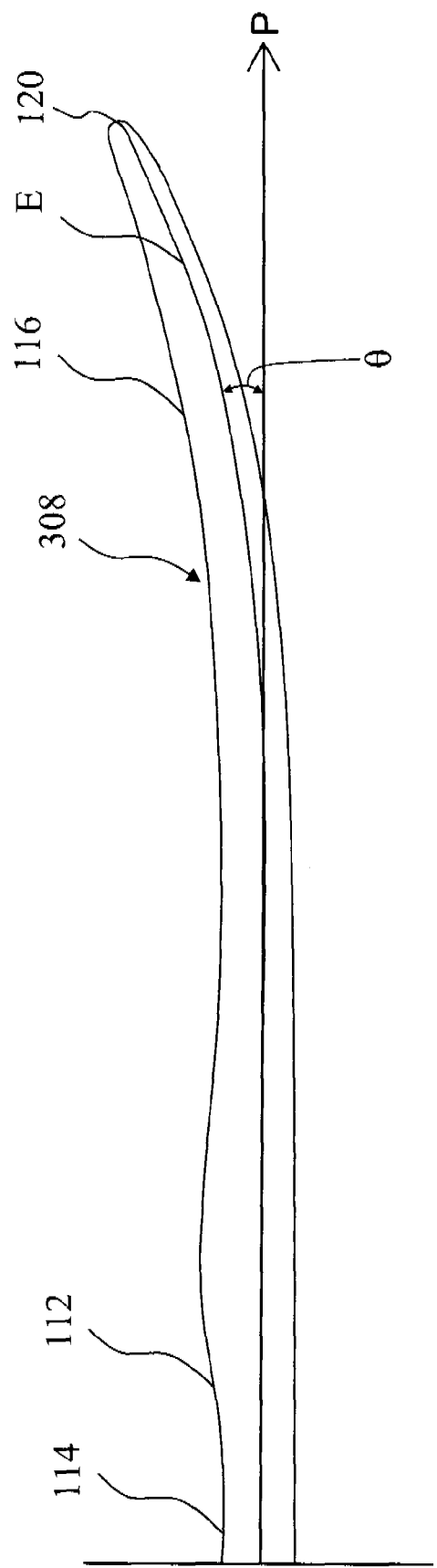
FIG. 4 is a graphical representation of a blade based upon a prior art wind turbine blade.
Figure 5:
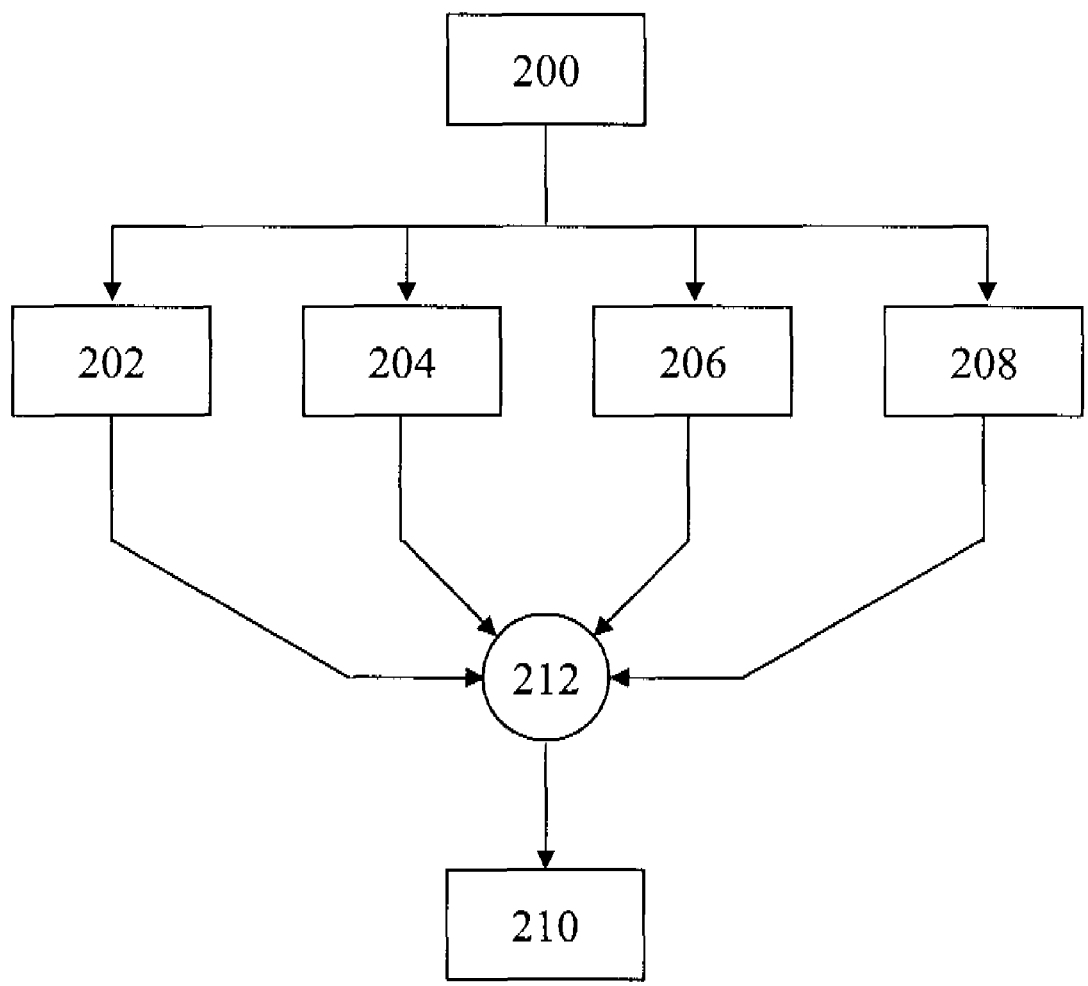
FIG. 5 is a flow chart of an exemplary method for fabricating wind turbine rotor blades with in-plane sweep.

FIG. 4 is a drawing of one example of a blade 308 that is based upon a prior art GE 37a blade. Both blades 308 of FIG. 4 and blade 108 of either FIG. 2 or FIG. 3 require the same geometric envelope for transportation purposes. Table I below shows the difference in tip twist that is induced by blade sweep when blade 108 and blade 308 are under maximum flapwise load as estimated from computational modeling, and the corresponding root pitch torque due to the sweep. It is apparent that blade 108 with both forward and aft sweep produces greater coupling with no increase in pitch torque.

TABLE I

| | BLADE: | |
|---|---|---|
| | NO FORWARD SWEEP (308) | FORWARD SWEEP INBOARD (108) |
| Root Sweep (degrees positive represents sweep in the aft direction) | 0 | −2.9 |
| Blade envelope width (m) | 3.6 | 3.6 |
| Tip Twist Under Load (degrees) | 4.69 | 5.52 |
| Root Pitch Torque due to Sweep (kNm) | 68.2 | 0 |

An aerodynamic center of outboard sections 116 lie aft (in a tangential sense) of elastic axis E of sections further inboard. As a result, the force normal to the plane of rotor 106 at a given section 116 will induce a significant nose down pitching moment about elastic axis E inboard of that station. This pitching moment will in turn cause blade 108 to twist nose down at all stations inboard. More importantly, however, when a wind gust strikes blade 108, the gust will induce an increase in an angle of attack experienced by an outboard section 116 and hence increase the lift produced by sections 116. That increase in lift will in turn induce a nose-down twisting of blade 108, which offsets some of the increased angle of attack, thereby relieving some of the gust-induced load.

By way of further explanation, consider an elemental model of a swept blade. In this type of model, a blade 108 is modeled as a plurality of spanwise elements of blade 108. Assume that the in-plane location of the classic axis relative to the pitch axis is given by the function $y_{ea}(z)$, where $Y_{ea}(0)=0$ is presumed. (Note that all references to blades and blade sections utilize reference numerals already introduced in FIGS. 1 and 2, even though the shapes of the blades being discussed with reference to the model as well as the relative lengths of the sections may differ from that shown in FIGS. 1 and 2.)

First assume that the aerodynamic loading is uniform over each element, such that the net force acts through the mid-point of the element. Calculating forces, V, and moments, M, for each element relative to the axis of that element allows a simple analysis. From the geometry, for each element, i, the following relationships apply:

$$V_{inboard,i} = V_{outboard,i} + V_{mid,i} \quad (1)$$

$$M_{y,inboard,i} = \left(V_{outboard,i} + \frac{1}{2}V_{mid,i}\right)\Delta \ell_i + M_{youtboard,i} \quad (2)$$

-continued $$M_{y,outboard,i} = (M_{y,outboard,i+1})\cos(\theta_{i+1} - \theta_i) - \qquad (3)$$
$$(M_{z,inboard,i+1})\sin(\theta_{i+1} - \theta_i)$$

$$M_{z,outboard,i} = (M_{y,inboard,i})\sin(\theta_{i+1} - \theta_i) + \qquad (4)$$
$$(M_{z,inboard,i+1})\cos(\theta_{i+1} - \theta_i)$$

$$M_{z,inboard,i} = M_{z,outboard,i} = M_{z,i} \qquad (5)$$

where indices i refer to discrete spanwise elements on a blade, such as are used to analyze the blade in turbine dynamics simulation software; the subscript notations outboard or inboard refer, respectively to the loads at the outboard or inboard end of each such element; $M_y$ and $M_z$ refer, respectively, to the flapwise (out-of-plane) and torsional moments; θ refers to the angle of the element elastic axis relative to the blade pitch axis, as measured in the plane of rotation; and $\Delta l_i$ is the length of the element i, given by:

$$\Delta \ell = \sqrt{(y_{i_{outboard}} - y_{i_{inboard}})^2 + (z_{i_{outboard}} - z_{i_{inboard}})^2} = \frac{\Delta z_i}{\cos\theta_i}. \qquad (6)$$

The increase in twist across any element is then given by:

$$\Delta \psi_i = \frac{M_{z,i}}{(GJ)_i} \Delta \ell_i \qquad (7)$$

where GJ is the torsional stiffness of the blade and the cumulative twist at the outboard end of any element i is given by:

$$\psi_{outboard,i} = \sum_1^i \Delta \psi_i. \qquad (8)$$

The sign convention here is such that it is assumed that the positive V forces of interest are the flapwise forces directed downward (i.e., out of plane), positive sweep angles, θ, correspond to sweeping the blade sections towards the trailing edge (i.e., aft in a tangential sense), and positive pitching moments, $M_z$, are such as to induce positive (i.e., nose up) twist, Δψ. Various configurations of the present invention provide nose-down twist.

Equations (4) and (5) show that the loading outboard of an element i induces a pitching moment on that element whenever there is a change in sweep angle at the outboard end of that element. This fact demonstrates that the pitching moment, $M_z$, can only increase whenever there is a change in the sweep. If $\theta_i = \theta_{i+1}$, then the sine term in equation (4) is zero, $M_{z,outboard,i} = M_{z,inboard,i+1}$, $M_{z,inboard,i} = M_{z,inboard,i+1}$, and there is no increase in $M_z$, so that changes in sweep are necessary to produce increases in pitching moment.

More particularly, the sweep of outboard sections 116 must be measured relative to elastic axis E inboard and not relative to some arbitrary axis such as pitch axis P. Thus, various configurations of the present invention do not simply sweep blade 108 straight from root 114. A straight blade 108 with only a knee at root 114 will experience no pitching moment along its entire length because no sections are actually swept with respect to elastic axis E itself, except for the kink at the very root 114. All of the pitching moment will be absorbed solely at root 114. However, at root 114, the torsional stiffness is so high that little twisting will occur.

Equations (4) and (5) also show that the greater the change in angle from element to element (and hence, the greater the tangential offset of each subsequent section), the greater will be the twist-inducing moment. However, large amounts of sweep can also provide negative consequences. Namely, if the total length of a blade 108 measured along elastic axis E is maintained, then the radius of blade 108 must be reduced. Alternatively, if the radius of blade 108 is maintained, then as blade 108 is swept, the length of blade 108 will grow. Either approach adversely affects energy capture, blade weight, and/or stiffness.

By measuring the total sweep in terms of tangential (i.e., y) displacement of blade tip 120 relative to root 114 of elastic axis E, equation (6) yields the following relationship for the displacement of tip 120:

$$y_{tip} = \sum_{i=1}^{N} \Delta \ell_i \sin\theta_i = \sum_{i=1}^{N} \Delta z_i \tan\theta_i. \qquad (9)$$

In some configurations of the present invention, the radius of blade 108 is maintained at a baseline value R. It then follows that:

$$R = \sqrt{y_{tip}^2 + z_{tip}^2} = \sqrt{\left[\sum_{i=1}^{N} \Delta z_i \tan\theta_i\right]^2 + \left[\sum_{i=1}^{N} \Delta z_i\right]^2}. \qquad (10)$$

Knowing that the shortest distance between two points is a straight line, it follows from equations (6) and (10) that the shortest blade 108 with the greatest sweep in terms of tangential displacement of tip 120 is a straight blade 108 that sweeps from its root 114. However, this blade will probably induce little if any twist due to the torsional rigidity of root 108. It also follows that this blade will exhibit the minimum peak sweep. More specifically, if one tries to achieve the same tip displacement with another shape, some section of blade 108 will exhibit higher sweep. For example, a curved blade with elastic axis E parallel to pitch axis P at root 114 will necessarily have to curve more outboard in order to achieve the same displacement at tip 120. This blade will be longer. Furthermore, higher sweep angles will also create a negative aerodynamic impact that can be difficult to quantify.

Therefore, in some configurations of the present invention, a blade is made by first determining a blade shape 108 by selecting 200 sweep angles of each element so as to:

(a) increase or maximize 202 the amount of twist induced and the distribution of the twist in such a manner as to create a reduction in loads, (b) reduce or minimize 204 the increase in blade material necessary to maintain tip deflection, (c) reduce or minimize 206 negative effects on aerodynamics, and (d) maintain 208 structural integrity.

The blade is then fabricated 210 in accordance with the determined blade shape.

The four objectives (a)-(d) above are not necessarily consistent with one another, so rather than attempting to achieve each objective, a Figure of Merit is defined that allows one to weight 212 the contributions of all of the effects into one measure. In some configurations of the present invention, the Figure of Merit is related to the cost of energy. (The Figure of Merit can be defined so that a higher value represents a better solution, although it could also be defined so that a lower value represents a better solution. Without loss of generality, it will be assumed herein that a higher Figure of Merit represents a better solution, although one of ordinary skill in the art would be able to perform the necessary mathematical manipulations to achieve equivalent results using Figures of Merit for which the reverse is true.) Various configurations of the present invention provide a high Figure of Merit, i.e., a low cost of energy. Ideally, the maximum possible Figure of Merit is sought, but the invention also includes within its scope desirable, but less than perfect configurations, as perfection is not required to achieved at least some of the advantages of the present invention.

In any practical configuration, it can be expected that a constraint will be placed on maximum tip tangential displacement, and that this constraint may relate to manufacturing or transportation limitations. Equation (4) shows that if one simultaneously imposes a fairly severe constraint on the location of tip 120 and also a constraint on the maximum sweep angle due to aerodynamics, then the "optimum" blade 108 is one that has two straight segments, namely, an inboard segment 112 having no sweep and an outboard segment 116 that has the maximum allowable sweep. Outboard of a knee between segments 112 and 116, there is no pitching moment, and inboard of the knee there is a constant pitching moment, which places the pivot point as far outboard as possible, so that the maximum spanwise extent of blade 108 is subjected to the pitching moment. In this configuration, the maximum possible twist is induced.

It is further possible to add an additional "aesthetic" constraint that eliminates sharp knees in the blade sweep. Such constraints can take on many forms, such as a maximum change in angle between any two elements of blade 108. Aesthetics could further dictate that a blade 108 having continuous curvature is more appealing than a blade 108 having straight sections, even if the straight sections are connected by a curved region rather than a knee. Such a constraint could be imposed in the form of a minimum angle between any two elements.

Once all of these constraints are imposed, some configurations iteratively select values for sweep angles of spanwise elements of a blade 108 so as to maximize (or at least increase) the Figure of Merit while satisfying all the constraints.

The location of elastic axis E (as opposed to pitch axis P) relative to outboard section or sections 116 is significant. The location of pitch axis P of blade 108, which is controlled entirely by how blade 108 is mounted to hub 110, has nothing to do with how much blade 108 will twist. The location of outboard section or sections 116 relative to pitch axis P, however, does have an influence on the moments induced about blade root 114 that a pitch system must withstand, and that is one of the costs of inducing blade twist in the manner described herein. However, this cost does not influence the physics of the twist-bend coupling.

More particularly, various methods for mounting blade 108 to root hub 110 are possible, each having its own costs and advantages. For example, equation (4) indicates that if blade 108 is actually swept forward (i.e., in-plane) at root 114 in the opposite direction from all the other sweep of blade 108, this forward sweep can be used to neutralize all of the pitching moment built up by blade sweep further outboard. As such, the forward sweep facilitates countering an amount pf torsion resulting from the aft sweep. In other words, if blade 108 is swept aft over the spanwise extent where it is torsionally flexible enough to induce twist, the all of that sweep-induced moment can be taken back out with a small region of spanwise sweep near root 114 where it is torsionally rigid. In such a configuration, there is no effect on the twist induced by the sweep, but the external pitching moment to which a pitch bearing and drive must react is reduced or eliminated.

To effect this reduction in sweep-induced moment, some configurations of the present invention provide a forward sweep of blades 108 only at their roots 114. Although some other configurations can introduce a forward sweep into hub 110, such other configurations would still have to have pitching moments taken out by the bearing and drives.

Referring again to equations (4) and (5), if the notation i=0 is used to refer to the values at the very root 114 of blade 108 (i.e., hub mount), and further noting that $\theta_0=0$ by definition, it follows that:

$$M_{z,0}=-(M_{y,inboard,1})\sin(\theta_1)+(M_{z,inboard,1})\cos(\theta_1). \quad (11)$$

At first glance, it may not be evident that $M_{z,0}$ does not equal $M_{z,inboard,1}$. However, the pitching moment is always measured about elastic axis E of the element, and so if the angle of the element changes, the axis about which the moment is measured changes. At root 114, the structure of blade 108 actually carries the torsion $M_{z,inboard,1}$. However, blade 108 is stiff with respect to torsion at root 114, so the fact that the structure of blade 108 carries torsion $M_{z,inboard,1}$ is largely irrelevant, and the value of $M_{z,0}$, which is directly related to the loads carried by the pitch actuator, is more relevant. Therefore, simply by sweeping root 114 of blade 108, the fundamental relationship between $M_{z,0}$ and $M_{z,inboard,1}$ is changed.

From a practical perspective, any particular configuration must effect the forward sweep over a finite span. However, so long as this sweep is effected over a portion of blade 108 that is torsionally highly rigid, the forward sweep will not induce adverse twisting.

The value of $M_{y,inboard,1}$, that is, the flapwise loading at root 114, is largely a function of the flapwise loading distribution over blade 108. The value of $M_{z,inboard,1}$ is dependent upon the magnitude and shape of the sweep over the full span of blade 108 and the distribution of flapwise loading. Equations (1) through (5) can be integrated starting at the tip element and moving inboard to calculate the loads on every spanwise element. Given some distribution of in-plane sweep and flapwise loading distribution, the value of $M_{z,inboard,1}$ will be a given. Once that value is known, then value of the root torsion, $M_{z,0}$, can be found using equation (11). Conversely, if a certain value of the root torsion is sought, then equation (11) can be used to find the appropriate value of the sweep of the first element $\theta_1$.

Specifically, if in some configuration, a zero net effect on root torsion is desired, then equation (11) is used to solve for:

$$\theta_1 = \tan^{-1}\left\{\frac{M_{z,inboard,1}}{M_{y,inboard,1}}\right\}, \quad (12)$$

which defines the optimum root forward sweep for zero net change in root torsion due to sweep.

When a wind gust strikes a blade 108 with aft sweep, the increase in out-of-plane (flapwise) loading also produces a pitching moment about sections further inboard that will act to induce the outer portions of the blade to twist the leading edge of the blade sections into the wind. The aerodynamic angle of attack of those sections is reduced, thereby ameliorating the peak transient loads which blade 108 would otherwise experience. Such twist-flap coupling through sweep results in substantial reductions in blade 108 flapwise transient loads, reducing both the ultimate flapwise loads and blade flapwise fatigue. Aft sweep can also generally produce reductions in other components of the loading of wind turbine 100, including tower top thrust force and tower top tilt and yawing moments. These load reductions translate into reductions in cost of energy from wind power by either removing expensive material from components subjected to the lighter loading of swept blade 108 or by increasing the diameter of blades 108 of rotor 106 to increase the energy production of wind turbine 100.

Table II, concerning the use of forward sweep at the root to zero root torsion, compares a blade with no forward sweep at its root to one having a forward swept root in which the entire blade is tilted forward by a few degrees. Table II shows that, by sweeping the blade forward at the root, root torsion can be eliminated because the blade is so torsionally stiff at the root that introducing forward sweep there has little or no impact on the twist response of the blade. From there outboard, the blade looks exactly the same, and so the twist response to sweep is exactly the same.

TABLE II

| Parameter | No Forward Sweep at Root | Forward Swept Root |
| --- | --- | --- |
| Location of elastic axis at tip, yea, tip (m) | 3.000 | 1.572 |
| Location of tip trailing edge, yTE, tip (m) | 3.420 | 1.992 |
| Depth of sweep (m) | 1.50 | 1.50 |
| Change in tip twist at baseline max deflection (degrees) | −1.79 | −1.79 |
| Effective coupling coefficient | 0.052 | 0.052 |
| Increase in root torsion (kNm) | 88.82 | 1.05 |
| Blade envelope height (m) | 3.281 | 2.444 |
| Blade envelope width (m) | 2.919 | 2.346 |
| Permissible change in rotor diameter | 0.9% | 0.9% |
| Net effect on cost of energy | −0.55% | −0.60% |

Another benefit of configurations of the present invention is that if the radius of rotor 106 is maintained, as blades 108 are rotated forward, the blade length, measured along elastic axis E, is reduced very slightly. This reduction accounts for the 0.05% improvement in cost of energy shown in Table II for the blade with forward root sweep.

Yet another benefit of sweeping blade 108 forward at root 114 is that the blade envelope is reduced for a given depth of sweep. For a given constraint on the envelope, allowing root 114 to sweep forward provides for a much greater depth of sweep.

In deference to aerodynamic considerations, some configurations of the present invention impose a constraint on the maximum sweep angle of any element. In such configurations, blades 108 have a maximum sweep forward at root 114 and the maximum sweep aft in outboard section 116 with a sharp knee. For example, for 15 degree maximum angle, some configurations of blade 108 have a 15 degree forward sweep at root 114 and a knee at 60% span with 15 degree aft sweep at tip 120.

Configurations of the present invention can be applied to an existing wind turbine 100 by replacing conventional blades with swept blade 108 configurations of the present invention blade without requiring expensive upgrades of pitch drive hardware, allowing full realization of the potential for reducing the cost of energy. Furthermore, forward sweep inboard also enables a greater magnitude of sweep-induced twist-flap coupling for a blade geometry that will fit within a given geometric envelope.

While the invention has been described in terms of various specific embodiments, those skilled in the art will recognize that the invention can be practiced with modification within the spirit and scope of the claims.

What is claimed is:

1. A blade having a torsionally rigid root, a forward sweep of an elastic axis in an inboard section of said blade and an aft sweep of the elastic axis in an outboard section of said blade, said forward sweep is at said root of said blade, wherein said forward sweep is defined as an angle extending between said elastic axis at said inboard section of said blade and a pitch axis of said blade, and said aft sweep is defined as an angle extending between said elastic axis at said outboard section of said blade and said pitch axis of said blade.

2. A blade in accordance with claim 1 wherein said forward sweep is at least 0.25 degrees.

3. A blade in accordance with claim 1 wherein said forward sweep is at least 0.5 degrees.

4. A blade in accordance with claim 1 wherein said forward sweep is at least 1 degree.

5. A rotor for a wind turbine, said rotor having a hub and at least one blade having a torsionally rigid root, an inboard section, and an outboard section, said inboard section having a forward sweep of an elastic axis of said blade and said outboard section having an aft sweep of said elastic axis, said forward sweep is at said root of said blade, wherein said forward sweep is defined as an angle extending between said elastic axis at said inboard section of said blade and a pitch axis of said blade, and said aft sweep is defined as an angle extending between said elastic axis at said outboard section of said blade and said pitch axis of said blade.

6. A rotor in accordance with claim 5 wherein said blade has a forward sweep of at least 0.25 degrees.

7. A rotor in accordance with claim 5 wherein said blade has a forward sweep of at least 0.5 degrees.

8. A rotor in accordance with claim 5 wherein said blade has a forward sweep of between 1 and 3 degrees, inclusive.

9. A rotor in accordance with claim 5 wherein said forward sweep is effective to counter an amount of torsion resulting from said aft sweep.

10. A rotor in accordance with claim 9 wherein an amount of said forward sweep is effective to neutralize a pitching moment built up by blade sweep further outboard.

11. A rotor in accordance with claim 5 wherein said blade has a root, a tip, and a knee at 60% span, and said blade has a 15 degree forward sweep at its root and a 15 degree aft sweep at its tip.

12. A wind turbine comprising a rotor having a hub and at least one blade having a torsionally rigid root, an inboard section, and an outboard section, said inboard section having a forward sweep of an elastic axis of said blade and said outboard section having an aft sweep of said elastic axis, said forward sweep is at said root of said blade, wherein said forward sweep is defined as an angle extending between said elastic axis at said inboard section of said blade and a pitch axis of said blade, and said aft sweep is defined as an angle extending between said elastic axis at said outboard section of said blade and said pitch axis of said blade.

13. A wind turbine in accordance with claim 12 wherein said blade has a forward sweep of at least 0.25 degrees.

14. A wind turbine in accordance with claim 12 wherein said blade has a forward sweep of at least 0.5 degrees.

15. A wind turbine in accordance with claim 12 wherein said blade has a forward sweep of between 1 and 3 degrees.

16. A wind turbine in accordance with claim 12 wherein said forward sweep is effective to counter an amount of torsion resulting from said aft sweep.

17. A wind turbine in accordance with claim 16 wherein an amount of said forward sweep is effective to neutralize a pitching moment built up by blade sweep further outboard.

18. A wind turbine in accordance with claim 12 wherein said blade has a root, a tip, and a knee at 60% span, and said blade has a 15 degree forward sweep at its root and a 15 degree aft sweep at its tip.

19. A method for making a blade for a wind turbine, said method comprising:

determining a blade shape by selecting sweep angles for elements of said blade so as to (a) increase or maximize an amount of twist induced and the distribution of said twist in such a manner as to create a reduction loads, (b) reduce or minimize an increase in blade material necessary to maintain tip deflection, (c) reduce or minimize negative effects on aerodynamics, and (d) maintain structural integrity; and fabricating a blade in accordance with the determined blade shape such that an inboard section of the blade has a forward sweep of an elastic axis of the blade and the forward sweep is at a root of the blade.

20. A method in accordance with claim 19 further comprising selecting a FIG. of Merit and weighting factors (a)-(d) in accordance with the selected FIG. of Merit.

21. A method in accordance with claim 20 wherein the FIG. of Merit is related to cost of energy.

22. A method in accordance with claim 20 wherein the blade has a tip, and further wherein determining a blade shape further comprises imposing a constraint on a location of the tip and on a maximum sweep angle.

* * * * *